April 4, 1967 W. R. EUBANK ETAL 3,312,924

SOLID STATE SWITCHING DEVICE

Filed Sept. 27, 1965

INVENTORS
WILLIAM R. EUBANK
DAVID L. CROSS

BY Carpenter, Kinney & Coulter
ATTORNEYS

United States Patent Office 3,312,924
Patented Apr. 4, 1967

3,312,924

SOLID STATE SWITCHING DEVICE

William R. Eubank, Troy Township, St. Croix County, Wis., and David L. Cross, St. Paul, Minn., assignors to Minnesota Mining and Manufacturing Company, St. Paul, Minn., a corporation of Delaware Filed Sept. 27, 1965, Ser. No. 490,519
6 Claims. (Cl. 338—20)

This application is a continuation-in-part of our earlier filed application S.N. 376,483 filed June 19, 1964 now abandoned.

This invention relates to new and very useful solid state semi-conductor polarity sensitive switching devices and to electrical circuits and methods for using such devices. The invention also relates to one class of glass compositions containing arsenic, phosphorus, sulfur and iodine useful in the manufacture of such devices. It has now been discovered that certain glass compositions, when suitably prepared into semi-conductor devices, exhibit a distinctive and characteristic polarity sensitive nonsymmetrical switching in response to an applied electric field. The invention is described in the following specification taken together with the drawings wherein:

Figure 1:
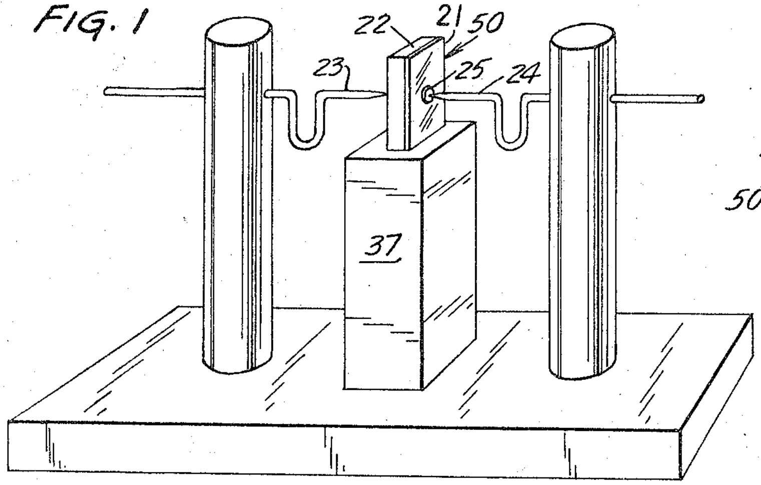
FIGURE 1 is one embodiment of a semi-conductor switch construction of this invention.

Devices of this invention use glasses which contain the elements arsenic, sulfur and iodine, and, optionally, the elements antimony and phosphorus. Thus, the glasses useful in the invention can be considered to comprise one ternary system, three quaternary systems and quinary system, as tabularized in the following Table I:

In general, the starting materials employed to produce the glasses used in devices of this invention either are the component elements themselves or are compounds of two or more such elements. When using uncombined elements, it is generally preferable to employ each in a highly purified and finely divided form. However, largely because of the high volatility of elemental iodine, it is convenient and preferred to employ compounds of iodine in place of iodine itself, for example $AsI_3$.

Finely divided flowers of sulfur are found to be a convenient form of that element to use for making compositions. Granular or powdered analytical grade arsenic, antimony or phosphorus are preferably employed. The sulfur and arsenic can be preferably prereacted in the ratio to form $As_2S_3$ before addition of the ternary component and subsequent formation of a glass, as described below.

In general, one can conveniently use two methods to prepare glass compositions of this invention. One method involves melting starting materials in a closed tube, and the other involves melting starting materials or remelting a glass formed in the closed tube in an open tube in order to vapor deposit thin glass layers on an aluminum substrate.

The closed tube method for preparing glasses of this invention involves melting the starting materials within a suitable heat resistant sealed tube, as indicated.

The tube after sealing is then preferably suitably mounted for axial rotational movements in a hot zone maintained at a temperature of about 800° C. or higher. Each sealed tube is approximately thus maintained in such hot zone for about ½ to 1 hour or until a homogeneous liquid melt is obtained. Thereafter, the tube and melt therein are removed from the hot zone and allowed to cool slowly. If any crystallization is visually observed, the tube and contents are remelted and then rapidly cooled.

When melting in an open tube, one can employ heat resistant glass tubes and deposit in each tube a measured premixed quantity of individually weighed desired start-

TABLE I.—GLASSES SUITABLE FOR VAPOR DEPOSITION OF THIN ORIENTED LAYERS [1]

| Glass System | | Compositional Range, Atomic Percent | | | | |
|---|---|---|---|---|---|---|
| | | Phosphorus (P) | Arsenic (As) | Antimony (Sb) | Sulfur (S) | Iodine (I) |
| I | As-S-I [2] | ---- | 11-44 | ---- | 40-92 | 2-28 |
| II | As-Sb-S-I [3] | ---- | 5-35 | 5-35 | 40-56 | 5-25 |
| III | P-Sb-S-I [3] | 1-8 | ---- | 29-40 | 42-52 | 5-20 |
| IV | P-As-S-I | 1-12 | 20-40 | ---- | 40-60 | 2-20 |
| V | P-As-Sb-S-I | 1-10 | 5-35 | >0-35 | 41-54 | 2-22 |

[1] Total atomic percent of respective elements in any given composition is always 100.
[2] In U.S. Pat. No. 3,024,119.
[3] In copending application S.N. 490,515.

The third quaternary system (glass system IV of Table I), arsenic-phosphorus-sulfur-iodine, and the one quinary system (glass system V of Table I) arsenic-phosphorus-sulfur-antimony-iodine, are described herein and constitute new classes of glass compositions which not only have utility in the manufacture of the semi-conductor devices of this invention, but which also are characterized by having unusually high vapor pressure when in a liquid (molten) condition. Such vapor pressure is characteristically higher than that of the other glasses above defined which are useful in devices of this invention.

Methods for the preparation of the quaternary and quinary glasses will now be given.

ing materials. Each such tube is then immersed into a hot zone maintained at a temperature usually above about 500° C. and preferably a little above about 550° C. Though times for the starting materials to melt and become homogeneous vary, they commonly range from about ½ to 1 hour, though longer or shorter times may be experienced depending on individual circumstances. Stirring helps promote homogeneity. After a homogeneous melt is obtained, the tube is removed from the hot zone and allowed to cool in air at room temperature. This cooling rate is generally slower than about 10° centigrade per second (10° C./sec.).

If one visually observes any crystallization in the melt as it thus slowly cools within the tube, such tube can be reinserted into the hot zone and the mixture remelted. Then when the hot tube and contents are removed from the hot zone, they are rapidly quenched, as my immersion into water at room temperature or the like, so as to rapidly cool such tube and contents at a rate greater than about 100° centigrade per second (100° C./sec.).

The sealed evacuated tube method for studying the glass-forming characteristics of the system studied is preferred since possible volatilization losses, resulting in slight compositional changes during melting are thereby eliminated. Also higher temperatures, by about 100° C., may be employed allowing solution of certain more difficultly soluble components to take place more readily. For practical purposes such as application of thin layers of the glass by vapor deposition on an aluminum substrate, however, it was necessary to employ the open tube method of melting. In many cases glasses made and characterized by the closed tube method were remelted and obtained as thin layers by the open tube method.

Independently of the method of melting and associated cooling, a quenched melt is next examined to determine its state and to see if glass formation has occurred.

For purposes of this invention in determining whether or not a cooled solid product is a glass, the following considerations are used:

(1) Presence of conchoidal fracture upon breaking of a sample.
(2) Substantially no birefringence when a sample is examined under a petrographic microscope (with a glass which is not too opaque for such an examination).
(3) Substantially no distinct lines when a sample is examined by the X-ray powder diffraction technique.
(4) Gradual softening and final remelting of a sample as its temperature is increased (in contrast to the sharp melting points characteristically observed in the case of crystallized materials).
(5) Pulling a long (e.g. 2.5 feet (about ¾ meter) or longer) fiber from a sample of molten material smaller than about ½ gram before such sample solidifies.

The examples given in Table II below illustrate typical glass compositions useful in this invention. In Table II, examples of glass formation within the scope of this invention are given.

By way of summary, glass compositions useful in making devices of this invention comprise arsenic, sulfur and iodine in amounts as defined by Table I. Optionally, such composition can have the arsenic present therein partially replaced by at least one of the elements selected from the group consisting of phosphorus up to about 12 atomic percent and antimony up to about 35 atomic percent (see Table I and Table II). A given composition should be such that when it is heated to a temperature range of from about 500 to 600° C., it has a vapor pressure in excess of 10 torr. In general, all glass compositions useful in this invention are characterized by having an ability to wet and adhere to an aluminum surface, said surface being characterized by (1) having a roughness not more than about 25 microinches (about 0.625 micron) r.m.s. (root mean square),
(2) being substantially free of aluminum oxide,
(3) being at a temperature not more than about 500° C.

The novel glass compositions of this invention (glass systems IV and V of Table I) are not only characterized by having an ability to wet and adhere to an aluminum surface as aforedescribed, but also are characterized by having a vapor pressure at temperatures in the range of from about 500 to 600° C., in excess of about 10 torr. and generally in excess of the vapor pressures associated with other glass compositions known to be useful in devices of this invention. Such high vapor pressures appear to be advantageous in depositing thin vapor coatings on aluminum substrates and for such reason these compositions can be considered a preferred type of glass composition for use in making devices of this invention. These novel glasses have a composition comprising from about 1 to 12 atomic percent phosphorus, from about 5 to 40 atomic percent arsenic, from about 40 to 60 atomic percent sulfur, from about 2 to 22 atomic percent iodine, and, optionally, from about 0 to 35 atomic percent antimony, the total atomic percent of all respective elements in any given composition always being 100.

Devices of this invention employ glass compositions as above described vapor deposited upon an aluminum metal substrate. Such substrates can be in any convenient physical shape. We find aluminum sheeting to be the preferred substrate material, apparently because of the preferred orientation of its surface crystals.

The surface of such a substrate upon which a glass

TABLE II.—THIN ORIENTED VAPOR DEPOSITED GLASS LAYERS ON ALUMINUM SUBSTRATE [1]

| Example No. | Starting Composition of Glass (Atomic Percent) | | | | | Relative Fluidity of Melt at 500° C. | Relative Vapor Pressure above Melt at 500° C. | Appearance of Vapor Deposited Thin Film on Aluminum Substrate | Switching Characteristic |
|---|---|---|---|---|---|---|---|---|---|
| | P | As | Sb | S | I | | | | |
| System I: | | | | | | | | | |
| 1 | ---- | 37 | ------ | 48 | 15 | High | High | Shiny, vitreous, continuous | Good polar. |
| 2 | ---- | 36 | ------ | 24 | 22 | do | do | do | Do. |
| 3 | ---- | 38 | ------ | 53 | 9 | Intermediate | Intermediate | Vitreous, somewhat uneven | Polar but erratic. |
| 4 | ---- | 13 | ------ | 84 | 3 | Very low | Low | Vitreous but uneven | Do. |
| System II: | | | | | | | | | |
| 5 | ---- | 16 | 21 | 48 | 15 | High | High | Same as Ex. 1 | Good polar. |
| 6 | ---- | 32 | 5 | 48 | 15 | do | do | do | Do. |
| 7 | ---- | 5 | 32 | 48 | 15 | do | do | do | Do. |
| 8 | ---- | 2.5 | 36 | 54 | 7.5 | Intermediate | Intermediate | do | Symmetrical. |
| System III: | | | | | | | | | |
| 9 | 4 | ------ | 33 | 48 | 15 | High | High | Vitreous, continuous but not very smooth | Switching only. |
| 10 | 8 | ------ | 29 | 48 | 15 | do | do | | Fair polar. |
| System IV: | | | | | | | | | |
| 11 | 12 | 25 | ------ | 48 | 15 | do | do | Vitreous but uneven | Polar but erratic. |
| 12 | 4 | 33 | ------ | 48 | 15 | do | do | Vitreous, even | Good polar. |
| 13 | 1 | 36 | ------ | 45 | 18 | do | do | do | Do. |
| 14 | 8 | 40 | ------ | 50 | 2 | do | do | do | Do. |
| 15 | 1 | 36 | ------ | 60 | 3 | do | do | do | Do. |
| 16 | 15 | 20 | ------ | 40 | 25 | do | do | Poor coating, dull and uneven | Could not be switched. |
| System V: | | | | | | | | | |
| 17 | 4 | 15 | 18 | 48 | 15 | do | do | Vitreous, even | Good polar. |
| 18 | 4 | 35 | 5 | 54 | 2 | Intermediate | Intermediate | Vitreous, uneven | Polar but erratic. |
| 19 | 2 | 5 | 30 | 41 | 22 | High | High | Vitreous, even | Good polar. |
| 20 | 10 | 10 | 15 | 48 | 15 | do | do | do | Do. |

[1] In these examples, the Al substrate consists of strips approximately 6 inches (about 15.25 cm.) long, ½ inch (about 1.27 cm.) wide, 16 mils (about 0.4 mm.) thick having one surface finished to about 3–5 microinches (about 0.075–0.125 micron (μ)) r.m.s. and freshly etched with 20% $NH_4OH$ solution.

composition is deposited needs to have certain characteristics. For one thing, such surface should be substantially free of aluminum oxides, such as those formed in situ by exposure of an aluminum surface to air (oxygen).

As used in this invention the term "substantially oxide free" or equivalent language in reference to the surface of an aluminum substrate used in a switching device of this invention denotes the fact that such surface has no aluminum oxide thereon other than that in situ aluminum oxide which is produced by exposure of an aluminum surface to air at room temperature (20° C.) for a period of time of about 12 hours after that aluminum surface has been first immersed in an aqueous solution of 20% ammonium hydroxide for a period of time sufficient to remove any in situ aluminum oxide on such surface and thereafter removed from such solution, washed with water and dried.

Before being vapor coated with a glass, an aluminum substrate surface should be "cleaned" to remove aluminum oxide therefrom.

While such oxide can be removed by various conventional means, it is preferred for purposes of this invention to etch the surface of the aluminum by chemical treatment to remove said oxide layer. One preferred etching procedure which has been found entirely satisfactory for purposes of this invention is as follows:

(1) Rinse the surface of the aluminum substrate in a solvent of trichloroethylene or other suitable degreasing liquid.
(2) Dry the rinsed surface in air.
(3) Place the aluminum substrate surface into a bath of ammonium hydroxide and distilled water (10 to 20% $NH_4OH$) and leave for about 5 minutes. The surface, alternatively, can be kept in such bath until gas evolution is visually detected coming from the surface of the aluminum.
(4) Rinse the so-etched aluminum surface in three different baths of distilled water. The strips are suitably soaked in each bath for 5 to 10 minutes at room temperature.
(5) Dry the washed surface in air. The strips can now be used to form devices of the invention.

Also, for purposes of making devices of this invention, the surface of the aluminum substrate should have a roughness not greater than about 25 microinches (about 0.625 micron ($\mu$)) r.m.s. Preferably, such surface should possess reflector grade properties to which reference is had to the conventional trade designation of aluminum sheet metal having a surface roughness of not more than about 5 microinches (about 0.125 micron ($\mu$)) r.m.s.

Thin layers of glass compositions as above described can be vapor deposited on an aluminum substrate as above described by any conventional method.

However, one method which has been found to be especially satisfactory and convenient involves beginning with a glass prepared, for example, in a closed tube as above described. Then one remelts same in an open tube in which only the bottom part of the tube is heated and the volume of the glass in the hot zone is small compared to the total volume of the tube so that the glass when melted at a temperature above 500° C. has a substantial vapor pressure above the liquid thereby effectively replacing a large percentage of air in the tube. Such a high concentration of vapors readily condenses on a cool (i.e. initially room temperature) aluminum substrate surface having a smoothness and oxide freeness as above described.

Such aluminum substrate typically in the form of a strip of sheet metal is held in the vapors above the melt of the glass for a period of time sufficient to deposit an integral continuous film. Usually this requires two to three minutes. During this period the temperature of the aluminum substrate surface may rise several hundred degrees centigrade but generally remains substantially below the temperature of that of the molten glass.

After a desired quantity of the vapors have been deposited on the substrate as a smooth glass layer, the so-coated substrate is withdrawn from the tube interior and allowed to cool in air to room temperature. Glass deposited in this manner is generally substantially continuous on the aluminum substrate and has a glossy shiny appearance. The color ranges from a bright yellow for those compositions containing essentially only arsenic, sulfur and iodine to a dark red for those compositions containing substantial amounts of antimony together with the arsenic, sulfur and iodine.

The thickness of the layer deposited will depend to considerable extent on the time that the aluminum substrate is held in the vapors above the melt. Usually and preferably the thickness of a vapor deposit ranges from about 0.07 mil (about 0.00175 mm.) to 1 mil (about 0.025 mm.) as measured with a micrometer caliper though those skilled in the art will appreciate that deposits a little thicker or thinner than this are within the spirit and scope of this invention so long as they display polarity sensitive switching characteristics when activated (i.e. when conduction is induced). After cooling, the layers of glass on aluminum substrates are tested for switching and electrical properties in the manner hereinafter described.

Care should be taken not to leave the aluminum substrate in the vapors of glass too long since then the deposited layer of glass becomes excessively thick and also the aluminum substrate heats up to melting temperatures causing the glass deposit to change in character, assume variable thicknesses and in general, causing the glass layer produced to be inoperable for use in making devices of this invention.

An important characteristic of the glass layer is that it can be ordered as seen by X-ray diffraction back reflection analysis with respect to the aluminum substrate. It is believed that this glass ordering in the thin layers described plays an important role in the switching characteristics in the polarity sensitive characteristics in the devices described.

As those skilled in the art will appreciate, the term "ordered" as used in this application has reference to a fixed relationship between the atoms in the glass layer and the atoms in the surface layer of the substrate. It is believed, although we do not wish to be bound by theory, that the aluminum substrate, whose properties are as described earlier, affects the manner in which vapors of the afore-described glass compositions deposit thereon. Aluminum as described above probably has a preferably oriented surface as respects the metal crystals therein and causes at least a partial ordering of the vapor deposited glass layers. When these layers are in excess of about 1 mil (about 0.025 mm.), we find that the polarity sensitive switching does not appear to occur and we attribute this to the fact that when the glass layer on the aluminum substrate surface exceeds about 1 mil (about 0.025 mm.) in thickness the glass is no longer partially ordered in the manner necessary to produce polarity sensitive switching.

Figure 2:
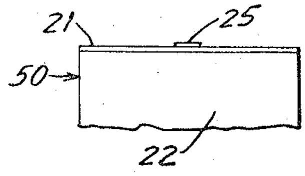
FIGURE 2 is an enlarged vertical sectional view of the semi-conductor switch device of FIGURE 1.

A typical embodiment of this invention is shown in FIGURES 1 and 2 as device 50. A device 50 is mounted for electrical and switching tests as illustrated in FIGURE 1. The switching element of device 50 consists of a thin vapor deposited layer 21 of a glass having a composition as above described upon the substantially oxide free, smooth surface of an aluminum substrate 22 (the lower portion of which is broken away in FIGURE 2).

In the central portion of the exposed surface of the glass layer 21 is preferably, though not necessarily conveniently deposited a small amount of a conductive electrode material 25 to provide a position on the exposed surface of the glass layer where electrical contact with the surface can be made of the glass 21 without injury thereto, as with a pointed electrode 24.

A device 50 can be positioned on a support 37 (FIGURE 1) between a pointed electrode 24 of tungsten or the like which contacts the glass face 21 through silver deposit 25 and a second pointed electrode 23 of similar construction.

Figure 4:
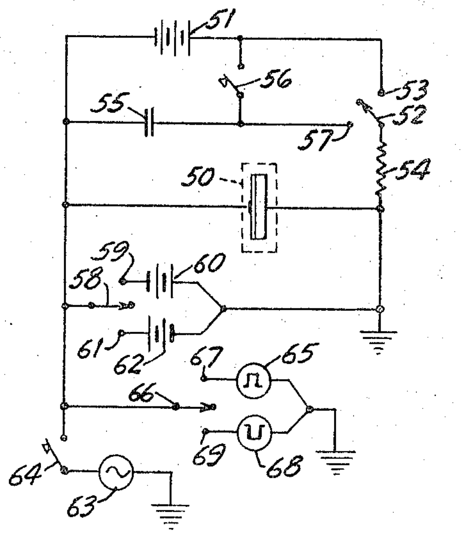
FIGURE 4 is one embodiment of a circuit diagram of an electrical circuit suitable for inducing conduction and for making electrical measurements upon a device of this invention.

In FIGURE 4 is shown a schematic circuit diagram illustrating two means of inducing conduction in a device 50 of the invention and three means for switching a device 50 of the invention. A device 50 is made (i.e. in a nonconductive condition) is positioned in the circuit of FIGURE 4 as shown. An electric field, say of the order of 100 volts per mil (about 4000 v/mm.), depending upon the construction of device 50, from a voltage source 51 is applied to device 50 by closing the single pole double throw switch 52 to position 53. A suitable resistor 54 having a value of say 50 kiloohms, depending upon the type of device 50 invloved, limits current through the device 50 and acts as a voltage divider until after it is made semi-conductive.

Figure 3:
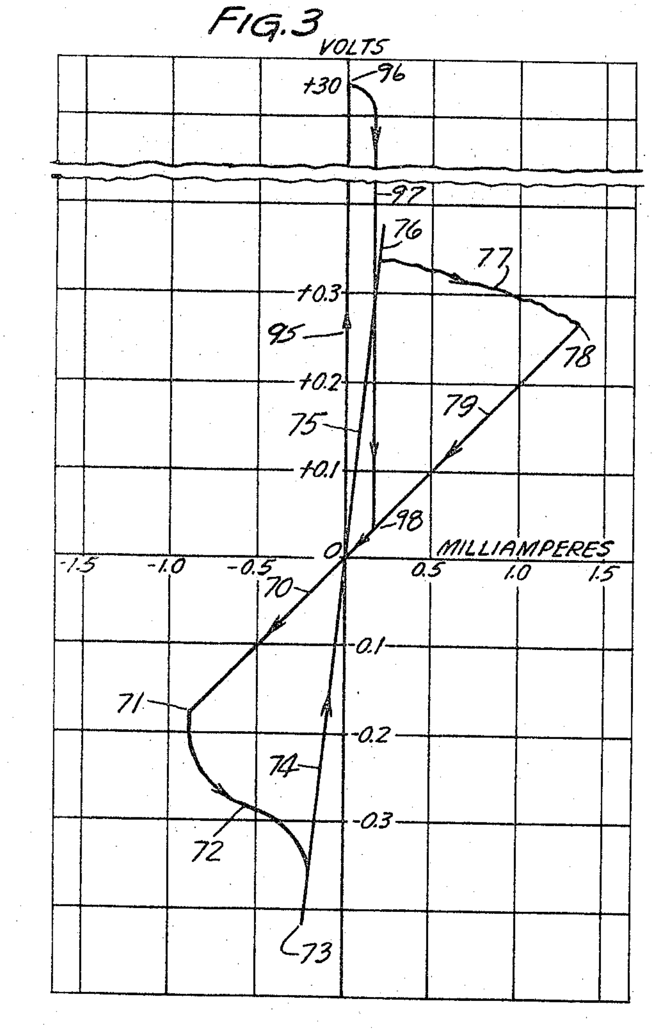
FIGURE 3 is a plot of the voltage-current characteristic associated with a device of this invention.

The device 50 can, alternatively, be made conductive by means of a capacitor 55 which is initially charged by voltage source 51 by closing the switch 56. Capacitor 55 is then discharged through resistor 54 and the device 50 by opening switch 56 and closing single pole double throw switch 52 to position 57. Referring to FIGURE 3, the voltage-current characteristic that results from the induced conduction step is shown. Starting at the origin, as positive voltage is applied to device 50 a high resistance slope along curve 95 is followed. At a value of say about 100 volts per mil (about 4000 v./mm) (point 96) current rapidly increases. The curve then follows curve 97 to point 98 during which time the transition to a low resistance state rapidly occurs. The voltage is then decreased to zero along slope 79.

The device 50, now having induced conduction, is initially in its low resistance state and can be made to switch to its high resistance state by application of relatively low voltages as is typical of a device of this invention.

The element is switched to its high resistance state from its low resistance state by closing single pole switch 58 to position 59 so as to cause a small negative voltage from battery 60 to be impressed upon device 50. The voltage also can be impressed in the form of a pulse. Continued application of voltage is not required to retain device 50 in its high resistance state.

Device 50 thus in its high resistance state, is readily switched to its low resistance state by closing swtich 58 to position 61 whereby a small positive voltage from battery 62 is applied to device 50 with the result that the device 50 is switched to its low resistance state. Usually the amount of voltage required to switch device 50 from its high resistance state to its low resistance state is greater than that required to switch such device 50 from its low resistance state to its high resistance state. Continued application of voltage, as in the case of switching from the low resistance state to the high resistance state is not required to retain device 50 in its low resistance state.

Switching speed between the respective two resistance states is rapid. For example, when a low voltage pulse of positive polarity as from a pulse generator 65 having a pulse duration of one microsecond or less is applied to the device 50, as by closing the single pole double throw switch 66 to position 67, device 50 is switched from its high resistance state to its low resistance state. When device 50 in the low resistance state is subjected to a negative voltage of short duration, say 1 microsecond or less from pulse generator 68 by changing single pole double throw switch 66 from position 67 to position 69 it is switched to a high resistance state. Such a pulse switching procedure can be repeated indefinitely.

When device 50 is subjected to low voltage alternating current from a signal generator 63 by closing only switch 64, device 50 switches to its high resistance state during the negative part of the alternating current cycle and to its low resistance state during the positive part of the cycle. Thus on 60 cycle alternating current, a device 50 switches 120 times, occupying its high resistance state 60 times and its low resistance state 60 times. At higher frequencies, typically of the order of 200 kilocycles or more, capacitance effects inherently associated with a device 50 become pronounced and necessarily interfere with the switching reliability. This is not a problem, however, when intermittent pulse switching, such as that characteristic of computer circuits, is employed. Continuous switching with alternating current serves as a convenient way to count the number of switches a device 50 makes.

Referring to FIGURE 3 there is seen a plot of the voltage-current characteristic of a device of the invention. If a small negative voltage is applied to a device 50 (assume it to be in its low resistance state), the voltage current plot starts at the origin and increases linearly along curve 70 until point 71 is reached. At this point corresponding to a value of, say about 0.2 volt and 0.8 milliampere, device 50 undergoes an abrupt change of state in a time interval of the order of a microsecond or even less and passes through a first fast transition region 72 to a high resistance state designated by point 73. Device 50 now follows another linear voltage-current curve 74 and allows currents only of the order of a few micro-amps to pass. As the voltage is decreased to zero and then increased in the positive direction, the voltage-current plot again passes through the origin along curve 75 until a value of, say, about 0.3 volt is reached at point 76. At this point, device 50 again changes state and rapidly passes through another transition region 77. The device 50 is now back in its low resistance state at point 78 and as the voltage is decreased to zero follows curve 79. The voltage-current characteristic can be retracted indefinitely using the proper specified polarity conventions.

By the term "polarity sensitive switching" as used in this application, reference is made to a characteristic transition between high and low resistance states such that, after a transition from a characteristic high to a characteristic low resistance state has taken place in a given device, or vice versa, in response to an applied electric field of predetermined polarity, the polarity of the electric field required for the next succeeding transition is opposite to that applied to effect such preceding transition. Such switching is further characterized by the fact that when polarity conventions opposite to those established are used for the next succeeding transition (i.e. the polarity of the applied electric field is the same as that used for the preceding transition) electric fields about 25 to 50% higher are generally required to effect such a transition. Generally, when such a higher electric field has been used to effect such a transition, a device of the invention no longer switches upon the subsequent application of a pulse of the opposite polarity. Characteristically, electric fields needed to effect polarity sensitive switching in accordance with this invention are generally at least an order of magnitude and commonly two orders or more of magnitude smaller than those electric fields heretofore known in the art for effecting so-called symmetrical switching. No current limiting or voltage dropping series resistor is generally required in polarity sensitive switching.

Polarity sensitive switching characteristics of some devices of this invention are given in Table III below:

TABLE III.—POLARITY SENSITIVE SWITCHING CHARACTERISTICS OF ORIENTED THIN GLASS FILMS

| Example No. | Thickness on Aluminum Substrate | | Voltage Required to Induce Conduction | | High Resistance | | Low Resistance | | Requirements | | | | | | | |
|---|---|---|---|---|---|---|---|---|---|---|---|---|---|---|---|---|
| | | | | | | | | | Downswitch [1] | | | | Upswitch [2] | | | |
| | | | | | | | | | Voltage per— | | Current (ma.) per— | | Voltage per— | | Current (ma.) per— | |
| | Mils | Mm. | v./mil | v./mm. | Ohms/mil | Ohms/mm. | Ohms/mil | Ohms/mm. | Mil | Mm. | Mil | Mm. | Mil | Mm. | Mil | Mm. |
| 1 | 0.4 | 0.01 | 95 | 3,800 | $7\times10^6$ | $2.8\times10^8$ | $2\times10^2$ | $8\times10^3$ | 0.6 | 24 | <0.01 | >0.4 | 0.5 | 20 | 1.0 | 40 |
| 5 | 0.5 | 0.0125 | 60 | 2,400 | $5\times10^5$ | $2\times10^7$ | $1\times10^2$ | $4\times10^3$ | 0.5 | 20 | <0.01 | >0.4 | 0.5 | 20 | 1.1 | 44 |
| 6 | 0.55 | 0.0138 | 70 | 2,800 | $3\times10^5$ | $1.2\times10^7$ | $1.5\times10^2$ | $6\times10^3$ | 1.2 | 40 | <0.01 | >0.4 | 1.4 | 56 | 2.0 | 80 |
| 7 | 0.6 | 0.015 | 85 | 3,400 | $3\times10^6$ | $1.2\times10^8$ | $5\times10^2$ | $2\times10^4$ | 0.2 | 8 | <0.01 | >0.4 | 0.3 | 12 | 0.6 | 24 |
| 8 [3] | 0.8 | 0.02 | 65 | 2,600 | $2\times10^6$ | $8\times10^7$ | $9\times10^2$ | $3.6\times10^4$ | 25 | 1,000 | 0.5 | 20 | 2 | 80 | 5 | 200 |

[1] "Downswitch" has reference to the change which occurs in a glass when it switches from its high resistance state to its low resistance state in response to an applied electric field.

[2] "Upswitch" has reference to the change which occurs in a glass when it switches from its low resistance state to its high resistance state in response to an applied electric filed.

[3] Composition is not polarity sensitive.

Figure 5:
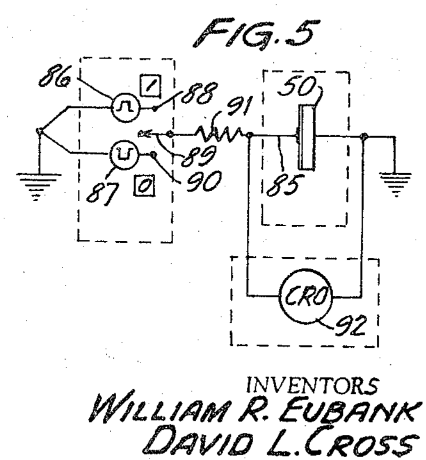
FIGURE 5 shows one embodiment of a schematic circuit diagram using a device of this invention.

A circuit using a device 50 is shown in FIGURE 5. To one face of device 50 a lead wire 85 is attached; the other face, the backside of the device, is grounded. This comprises what can be termed the device section of the circuit. The program section of the circuit consists of a power source capable of providing positive voltages and negative voltages to device 50. In the example of FIGURE 5 the power source is shown to be in the form of a positive voltage pulse generator 86 and a negative voltage pulse generator 87. It should be understood that the power source may be any source of alternate polarity electrical energy such as batteries or the like. The positive voltage source 86 is connected to a point 88 which is one terminal of a single pole double throw switch 89. Likewise, the negative voltage source 87 is connected to a point 90 which is another terminal of double throw switch 89. The other side of the positive voltage source 86 and negative voltage source 87 is grounded to complete the circuit so an input signal can be delivered to device 50. Double throw switch 89 is conected to device 50 through series resistor 91. Oscilloscope 92 is connected across device 50 to provide readout of the resistance state of the device.

The operation of this circuit is as follows: Starting with device 50 in a low resistance state such as results from the induced conduction procedure step previously described, either a positive voltage (denoted write-in signal 1 in FIGURE 5) from a pulse generator 86 or a negative voltage (denoted write-in signal 0) from pulse generator 87 is applied to device 50. For the purposes of this description, the low resistance state is assigned the digit 1 and the high resistance state is assigned the digit 0, although the opposite coding could be used according to individual preference. The magnitude of the write-in pulses are understood to be sufficient to switch the device according to its normal preferred polarity convention. Assuming that the binary digit 1 is to be written in, the positive voltage pulse is applied to device 50. Since it is already in a low resistance state corresponding to digit 1, device 50 is not affected by the write-in pulse and remains passive. However, if the binary digit 0 is to be written in, a negative voltage from pulse generator 87 is applied to device 50 which is of sufficient magnitude to switch from a low resistance state to a high resistance state. In the high resistance state the binary digit has now been written in. Once the program is written into the device 50 it will remain stored until the program is changed or in certain instances, when a destructive readout pulse is applied to said device.

The readout of the device is accomplished as follows: Starting with device 50 in a low resistance state as results from the previously described write-in 1 step, a positive voltage from pulse generator 86 is applied to device 50 by moving switch 89 to terminal 88. The magnitude of the readout pulses are of the same order as the write-in pulses. Series resistor 91 between switch 89 and device 50 is required only for the readout step and is not needed for the write-in step. Typically, the series resistor should be about the same order of magnitude in resistance as the low resistance state.

Because the removal of series resistor 91 would involve unnecessary switching in and out of the circuit it is left in the circuit for both write-in and read out steps. Since the readout pulse is positive and the device 50 is already in the low resistance state, no switching occurs. The wave form observed on the oscilloscope 92 corresponds to the wave form of pulse generator 86 with no change due to switching of the device 50. Now when device 50 is in a high resistance state as results from the previously described write-in 0 step, positive voltages from pulse generator 86 are again applied to said device. Since the readout pulse is positive and of sufficient magnitude to switch device 50 to a low resistance state, a characteristic wave form is observed on the oscilloscope. The wave form typically would show the initial voltage drop of the high resistance (digit 1) with an interruption due to rapid switching and finally the voltage drop of the low resistance state.

The embodiments of the invention in which an exclusive property or privilege is claimed are defined as follows:

1. A solid state switching device which, when semiconductive, is capable of altering its resistance from a high value to a low value and vice versa responsive to electric fields of predetermined polarity, said device comprising (a) a substrate of aluminum metal, said substrate having a surface characterized by
  (1) having a roughness not greater than about 25 microinches (about 0.625 micron) r.m.s.; and
  (2) being substantially free of aluminum oxide;
(b) a coating on at least a portion of said surface, said composition being an ordered vapor deposited layer not more than about 1 mil (about 0.025 mm.) in thickness of a glass composition, the minimum width of said layer being at least twice the thickness thereof;
(c) said glass composition being one selected from a group of glass systems defined by the following table:

| Glass System | Compositional Range, Atomic Percent | | | | |
|---|---|---|---|---|---|
| | Phosphorus (P) | Arsenic (As) | Antimony (Sb) | Sulfur (S) | Iodine (I) |
| As-S-I | -------- | 11-44 | -------- | 40-92 | 2-28 |
| As-Sb-S-I | -------- | 5-35 | 5-35 | 40-56 | 5-25 |
| P-Sb-S-I | 1-8 | -------- | 29-40 | 42-52 | 5-20 |
| P-As-S-I | 1-12 | 20-40 | -------- | 40-60 | 2-20 |
| P-As-Sb-S-I | 1-10 | 5-35 | >0-35 | 41-54 | 2-22 |

and (d) a pair of electrode means, one contacting said coating, the other contacting said substrate.

2. A glass composition suitable for use in a device as defined in claim 1 comprising:
from about 1 to 10 atomic percent phosphorus,
from about 5 to 35 atomic percent arsenic,
from about 41 to 54 atomic percent sulfur,
from about 2 to 22 atomic percent iodine, and
optionally from 0 to about 35 atomic percent antimony.

3. A glass composition comprising:
from about 1 to 12 atomic percent phosphorus,
from about 20 to 40 atomic percent arsenic,
from about 40 to 60 atomic percent sulfur, and
from about 2 to 20 atomic percent iodine.

4. In a method for switching a polar switching device of the type described in claim 1 from its characteristic high resistance state to its characteristic low resistance state, the step of applying an electric field across a said device sufficient to cause same to switch from said high resistance state to said low resistance state, said electric field having an appropriate polarity.

5. In a method for switching a polar switching device of the type described in claim 1 from its characteristic low resistance state to its characteristic high resistance state, the step of applying an electric field across a said device sufficient to cause same to switch from said low resistance state to said high resistance state, said electric field having an appropriate polarity.

6. The device of claim 1 wherein said layer is not less than about 0.07 mil in thickness.

References Cited by the Examiner

UNITED STATES PATENTS

| | | | |
|---|---|---|---|
| 3,024,119 | 3/1962 | Flaschen et al. | 106—47 |
| 3,117,013 | 1/1964 | Northover et al. | 106—47 |
| 3,177,082 | 4/1965 | MacAvoy | 106—47 |
| 3,241,009 | 3/1966 | Dewald et al. | 106—47 |
| 3,249,469 | 5/1966 | Stegherr | 252—514 |
| 3,258,434 | 6/1966 | Mackenzie et al. | 106—47 |

ANTHONY BARTIS, *Primary Examiner.*

RICHARD M. WOOD, *Examiner.*

W. D. BROOKS, *Assistant Examiner.*